US007218010B2

(12) United States Patent
Albertson et al.

(10) Patent No.: US 7,218,010 B2
(45) Date of Patent: May 15, 2007

(54) ENGINE RESTART APPARATUS AND METHOD

(75) Inventors: William C. Albertson, Clinton Township, MI (US); Mike M. McDonald, Macomb, MI (US); Dimitrios Rizoulis, Ann Arbor, MI (US); Kenneth J. Buslepp, Brighton, MI (US); Douglas R. Verner, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 96 days.

(21) Appl. No.: 11/058,072

(22) Filed: Feb. 15, 2005

(65) Prior Publication Data

US 2006/0181084 A1 Aug. 17, 2006

(51) Int. Cl.
*F02N 11/00* (2006.01)
*H02P 9/04* (2006.01)

(52) U.S. Cl. .................................................... 290/38 R

(58) Field of Classification Search .............. 290/38 R, 290/48; 123/179.3, 179.4; 74/6, 7 R
See application file for complete search history.

(56) References Cited

U.S. PATENT DOCUMENTS 3,154,689 A * 10/1964 Bubbenmoyer ........... 290/38 R
3,744,467 A * 7/1973 Wagner ................... 123/179.3
4,331,880 A * 5/1982 Dittman et al. ........... 290/38 R
4,464,576 A * 8/1984 Williams .................. 290/38 R
4,485,772 A * 12/1984 Uchida et al. ........... 123/179.4
5,345,901 A * 9/1994 Siegenthaler et al. ..... 123/179.3
5,402,758 A * 4/1995 Land et al. .............. 123/179.3
5,907,204 A * 5/1999 Matsushima et al. ..... 310/68 C
6,024,065 A * 2/2000 Hojna et al. ............. 123/179.3
6,148,781 A * 11/2000 Boegner et al. ......... 123/179.3
6,651,603 B2 * 11/2003 Osada et al. ............. 123/179.3
2004/0084002 A1 * 5/2004 Mitsutani et al. ........ 123/179.4
2006/0053913 A1 * 3/2006 Sinn ................................ 74/6

* cited by examiner

*Primary Examiner*—Julio C. Gonzalez
(74) *Attorney, Agent, or Firm*—John E. Kajander

(57) ABSTRACT

The present invention relates to a start-stop "mild hybrid" vehicle with a starting system which utilizes traditional engine and transmission architecture. The present invention separates the pinion actuator solenoid from the starter motor power switching circuit. A power relay is provided to switch the starter motor. The pinion gear in the present invention is pre-shuttled to, and held in mesh with, the flywheel ring gear during engine stop conditions. A "prime current" is then applied to the power relay just below that which is required to energize the power relay. Upon request for an engine start, the current will increase to energize the relay and allow the starter motor to spin. A significant amount of time lag is thusly removed from the starting system permitting an expedient restart and launch. The pinion actuator solenoid in this invention may also have two coils which may be selectively energized.

6 Claims, 3 Drawing Sheets

ENGINE RESTART APPARATUS AND METHOD

TECHNICAL FIELD

The present invention relates to an apparatus and method to quickly and efficiently restart a start-stop "mild hybrid" internal combustion engine by separating the pinion gear shuttling circuit from the starter motor power relay circuit, pre-shuttling the pinion gear to the flywheel ring gear, and providing the power relay with a "prime current" to reduce the time lag before restart.

BACKGROUND OF THE INVENTION

With the current thrust for more fuel efficient and low emission vehicles, many novel solutions for internal combustion engine architectures and operating strategies have been developed. One such strategy is to simply shut off the engine when the engine is operating in an idle mode. Many configurations have been proposed to effect a quick restart of the engine. The simplest and most cost effective systems incorporate a traditional or "off the shelf" starter/pinion gear and flywheel/ring gear configuration. As such, this type of start-stop strategy has minimal impact on engine and transmission architectures compared to other hybrid strategies. The response time of this system may be lengthy, which is an important consideration as automakers try to deliver seamless vehicle restart and launch. The time required to energize the traditional power relay switching and the drive gear engagement mechanisms of the starter account for a significant fraction of the total delay time.

This delay time can be better understood by way of explanation of the operation of a traditional starting system. The typical starter controls found in a vehicle today have the starting contacts contained within a key operated ignition switch. However, a pedal operated ignition switch may be employed for a "mild hybrid" configuration. When the ignition key is turned against spring pressure from the "on" position to the "start" position, the starting contacts close. This in turn connects a starter motor solenoid to the vehicle battery. A solenoid is required since the starter motor needs a massive feed of electrical current from the battery to set its internal components working.

Upon connection, coils contained within the solenoid become energized producing a magnetic field that pulls an armature inward. This armature engages a pinion actuator at one end, which in turn shuttles a pinion gear mounted to the starter motor shaft to engage the ring gear of the engine's flywheel. Located behind the pinion gear is a coil spring that will ensure that the pinion gear meshes with the flywheel ring gear in the event the gear teeth do not mesh properly in a condition referred to as "butting". Simultaneously, the armature movement forces a heavy switch to connect the starter motor to the battery and engine cranking will begin. The coils within the solenoid are of a sufficient magnetic strength to simultaneously shuttle the pinion gear and close the starter motor switch. A spring on the pinion actuator pulls the pinion out of mesh when the current to the solenoid is interrupted upon engine start. Although this method requires a lag time of only seconds, a more responsive method is desirable to ensure seamless operation of a start-stop "mild hybrid".

SUMMARY OF THE INVENTION

Accordingly, the present invention seeks to reduce the aforementioned lag time in the engine starting system for a start-stop "mild hybrid" engine utilizing a conventional engine starter and flywheel as well as providing a method to operate such a system.

The present invention separates the solenoid, which shuttles the pinion gear to the flywheel ring gear while providing the power connection to the starter motor, into two discrete circuits. The solenoid is retained to shuttle the pinion gear, however, a separate power relay provides the electrical connection between the battery and the starter motor. Controlled current sources, such as pulse width modulation devices, may be provided to allow both the pinion shuttle solenoid and the power relay to be energized with differing levels of current at different times during an engine stop condition.

By way of example, when the engine is stopped, the pinion shuttle solenoid is energized to the maximum pull-in current for a predetermined time to allow the pinion gear to shuttle to, and engage the flywheel ring gear. Should the teeth not mesh properly, in a condition referred to as a "butting", a coil spring is provided behind the pinion gear to hold the pinion gear against the flywheel. The current to the solenoid is then reduced to a "holding level". This holding level is also predetermined and dependent on the amount of current required to keep the pinion gear meshed with the flywheel ring gear teeth. An alternative method of accomplishing this reduced current "holding" state would be to provide two separate coils in the solenoid and allow one coil circuit to open when the solenoid armature is at full stroke. Concurrent with the pinion gear pre-shuttling operation, the power relay is provided a "prime current". This "prime current" allows the coil current in the relay to build to a level just below the point at which switching will occur, thereby eliminating much of the time lag inherent when switching a power relay absent a "prime current". Both the pinion gear and power relay are now in a favorable condition to allow a quick restart of the engine when a restart request is made.

Accordingly, the invention provides an internal combustion engine that is operable in start-stop mode which has: a starter motor having a pinion gear, a power relay for switching the starter motor, a battery for providing current to the starter, a pinion actuator solenoid for shuttling the pinion gear, a control unit with logic for operating said pinion actuator solenoid separately from the power relay, and a controlled current source for the power relay to provide a prime current level during engine off conditions and to increase the current to allow for switching of the power relay when a restart signal is sensed by the control unit. Another aspect of the foregoing internal combustion engine may also have a controlled current source for the pinion actuator solenoid that provides a maximum pull-in current for a predetermined amount of time during engine off conditions, and which decreases the current for the pinion actuator solenoid to a holding current at the end of the predetermined amount of time. The controlled current source for the power relay and the controlled current source for the pinion actuator solenoid may be pulse width modulation devices. In an alternative embodiment of the internal combustion engine of this invention, the pinion actuator solenoid may have two coils and an armature actuated set of electrical contacts openable to de-energize one coil, thereby energizing the pinion actuator solenoid at a relatively low current level in response to the control unit.

This invention also provides an improved method of current control for fast response to a restart signal for an engine having a flywheel ring gear and a traditional starter with a pinion gear and having a pinion actuator solenoid and a power relay and a control unit. The method includes: controlling current flow to the pinion actuator solenoid at maximum pull-in current for a predetermined amount of time sufficient to allow the pinion gear to shuttle to the flywheel ring gear, thereafter the pinion actuator solenoid current is decreased to a level to hold the pinion gear in mesh with the flywheel ring gear; and separately controlling current flow to the power relay at less than the minimum pull-in current to allow the relay coil current to ramp to a level that is insufficiently high enough to cause power switching of the power relay, but sufficiently high enough to eliminate a significant portion of the time required for the power relay to be switched in response to the restart signal. In an alternative embodiment of this method, the pinion actuator solenoid may have two coils and an armature actuated set of electrical contacts that are openable to energize the pinion actuator solenoid at a relatively low current level in response to the control unit to control the pinion actuator solenoid.

This invention further provides an improved system for restarting an engine having a pinion actuator solenoid and a power relay. The system includes: a first controlled current source for energizing the pinion actuator solenoid at a high and low current levels; a second controlled current source for energizing the power relay at a low and high current levels; and a control unit for the controlled current sources operative to control the first controlled current source at the high current level when the second controlled current source is controlled at the low current level; wherein the control unit being operative to control the first controlled current source at the low current level when the second controlled current source is being controlled at the high current level.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
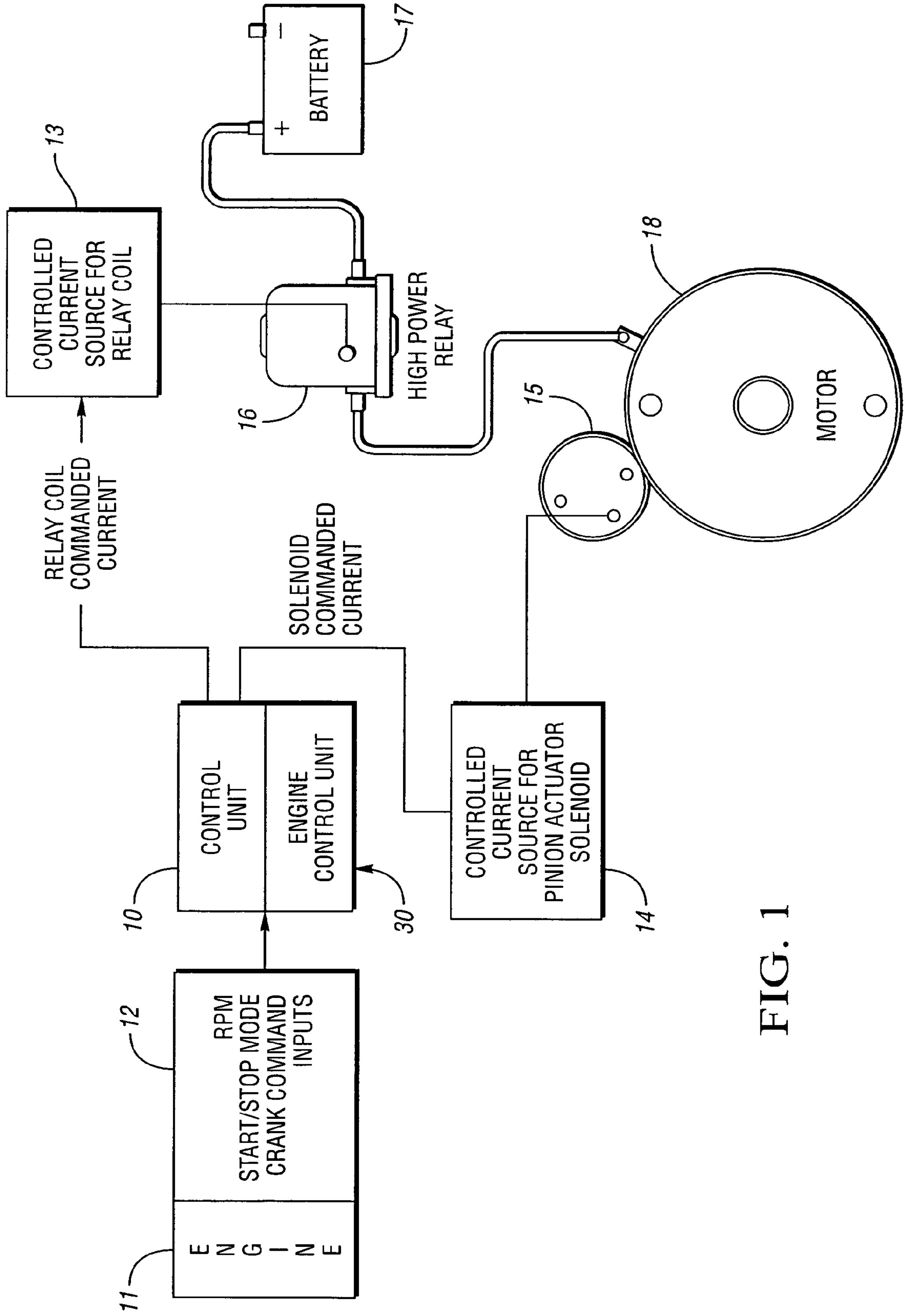
FIG. 1 is a schematic representation of the present invention showing a separate pinion actuator solenoid circuit and a separate starter motor power circuit with a power relay both circuits being energizable by controlled current sources.

The present invention is shown schematically in FIG. 1. The engine control unit 30 for engine 11 receives various inputs from the on-vehicle sensors 12 such as engine RPM, start/stop requests, vehicle speed, etc. The cranking control unit 10 may be contained in the engine control unit 30 or may be entirely separate. The inputs 12 are processed by the control unit 10 to determine in what state the engine cranking system should be. The control unit 10 is electrically connected to a power relay controlled current source 13 as well as to a pinion actuator solenoid controlled current source 14. The pinion actuator solenoid controlled current source 14 is connected to the pinion actuator solenoid 15. The power relay controlled current source 13 is connected to a power relay 16. The power relay 16 is connected in series linking the battery 17 and the starter motor 18. The typical voltage for an automotive battery 17 is 12 volts; however, the voltage may be decreased or increased according to the application. The controlled current sources 13, 14 in the preferred embodiment will be pulse width modulation (PWM) devices. However, those skilled in the art will recognize that other devices, such as rheostats and analog amplifiers, may be used without changing the inventive concept.

Figure 2:
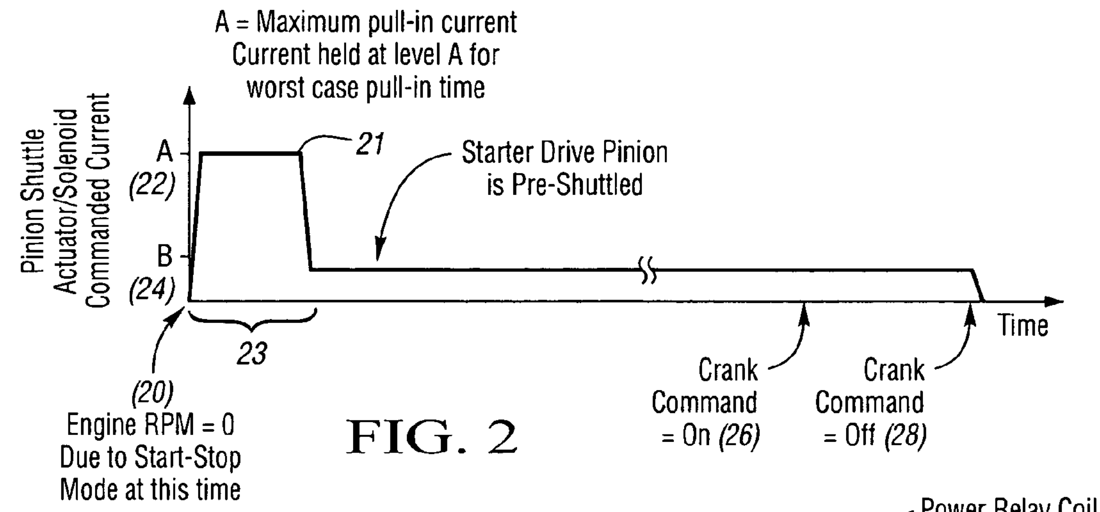
FIG. 2 is a graphical illustration of the engine start stop control strategy for controlling current to the pinion actuator solenoid.
Figure 3:
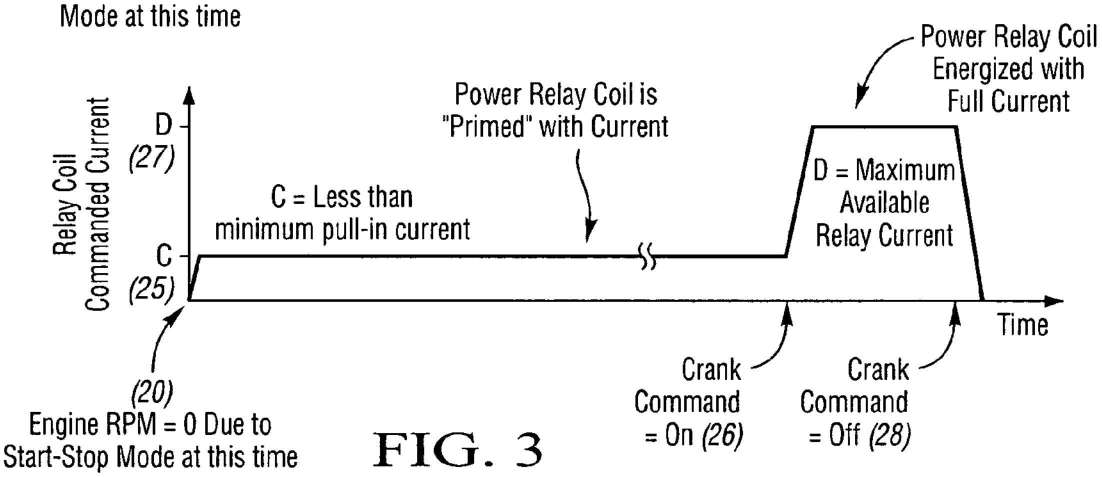
FIG. 3 is a graphical illustration of the engine start stop control strategy for controlling current to the pinion power relay.

The mode of operation for this arrangement will now be explained in further detail with reference to FIGS. 1, 2, and 3. When the vehicle comes to rest, a request will be made by the engine control unit 30 to shut down the internal combustion engine 11. Upon completion of this shut down event 20, the control unit 10 of the engine cranking system will receive inputs 12. The inputs 12, such as engine RPM and vehicle speed, will confirm to the control unit 10 that the engine is in the proper condition to operate the present invention. The control unit 10 will then command the pinion actuator solenoid controlled current source 14 which, in turn, will command the maximum required pull-in current 22(A) for a predetermined pinion shuttling time 23 allowing the pinion gear 58 (shown in FIGS. 5*a* and 5*b*) to shuttle to the flywheel ring gear 60 (shown in FIGS. 5*a* and 5*b*). Current level A is the maximum required solenoid pull-in current level specified by the manufacturer to guarantee pull-in of the pinion actuator solenoid 15. The applied current is held at level A for the worst case pull-in time. At the completion of the shuttling maneuver 21, the pinion actuator solenoid controlled current source 14 will then lower the current to the maximum holding current 24(B) that is required to keep the pinion gear 58 in contact with the flywheel ring gear 60. Current level B is the maximum holding current specified by the manufacturer that will guarantee that the pinion actuator solenoid 15 will remain in the pulled-in state. Concurrently, at the engine shut down event 20, the control unit 10 will command the power relay controlled current source 13 to a "prime current" level 25(C). The "prime current" level C is selected to be lower than the manufacturer specified minimum pull in current for the power relay 16. This will ensure that the "prime current" level C is at a level of current just below that which the manufacturer specifies is required for switching of the power relay 16.

After a period of time has elapsed, the operator or driver may command the engine 11 to crank, possibly by lifting his or her foot from the brake pedal. During the crank command, e.g. at 26, the control unit 10 will command the power relay controlled current source 13 to command the maximum available relay current 27(D). It is at this point that the power relay 16 is energized with sufficient current to allow the switching of the power relay 16 to occur. The time required to switch the power relay 16 has been reduced, since the power relay 16 has been provided a "prime current" level C. Upon switching, the connection between the starter motor 18 and the battery 17 will close causing the starter motor 18 to spin the pre shuttled pinion gear 58 against the flywheel ring gear 60 thereby cranking the engine 11. Upon engine start 28, the crank command is discontinued and the control unit 10 will cause both the power relay controlled current source 13 and the pinion actuator solenoid controlled current source 14 to disallow any current to both the power relay 16 and the pinion actuator solenoid 15.

Figure 4:
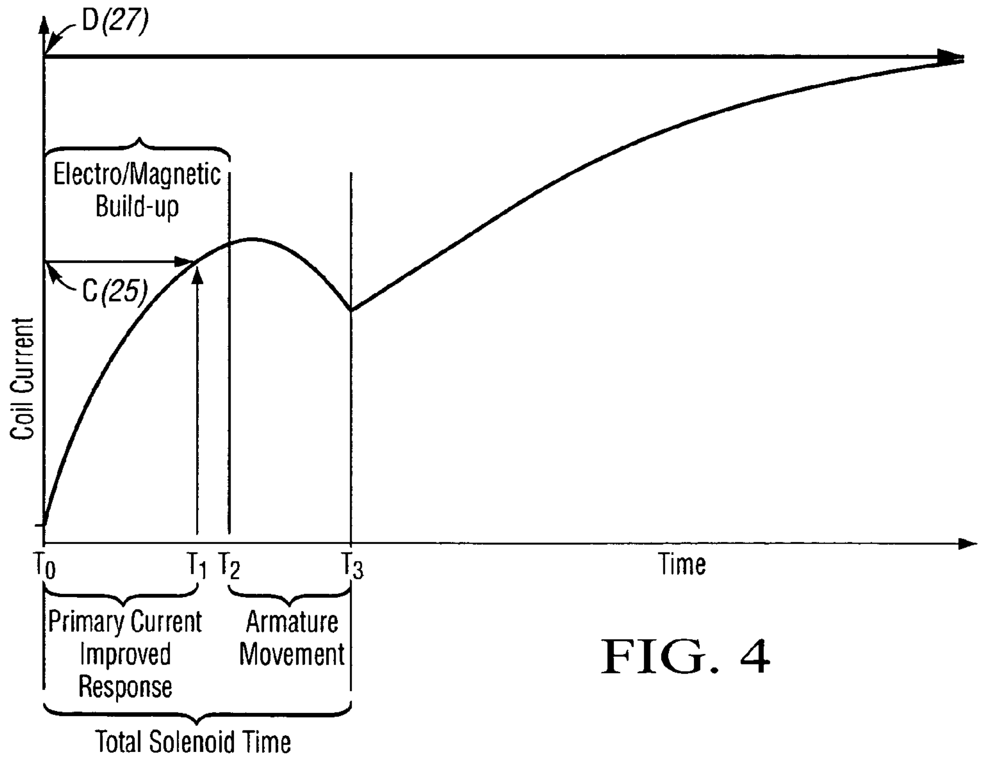
FIG. 4 is a graphical illustration of the response of a traditional relay to applied current and demonstrates the lag time traditionally associated with energizing the coil within the relay.

FIG. 4 is a graphical illustration of the response of a typical or traditional power relay 16 to an applied current. Even though the maximum available relay current level D is applied to the relay at $T_0$, the armature of the relay does not begin to move until $T_2$. This time lag can be attributed to the electro-magnetic "build up" required by the coil within the power relay 16. At $T_3$ the armature is at full stroke. The total time from application of maximum available relay current D to the point in which the relay armature is at full stroke may be characterized by subtracting $T_0$ from $T_3$. The present invention removes much of the lag time from the cranking system by providing a "prime current" level C to the power relay 16. This "prime current" level C corresponds to the point $T_1$ on the time axis. The total time saved by providing the "prime current" level C can be characterized by $T_0$ subtracted from $T_1$. For this particular example, the time saved by applying a "prime current" level C to the power relay 16 is approximately 50% of the power relay activation time.

Figure 5A:
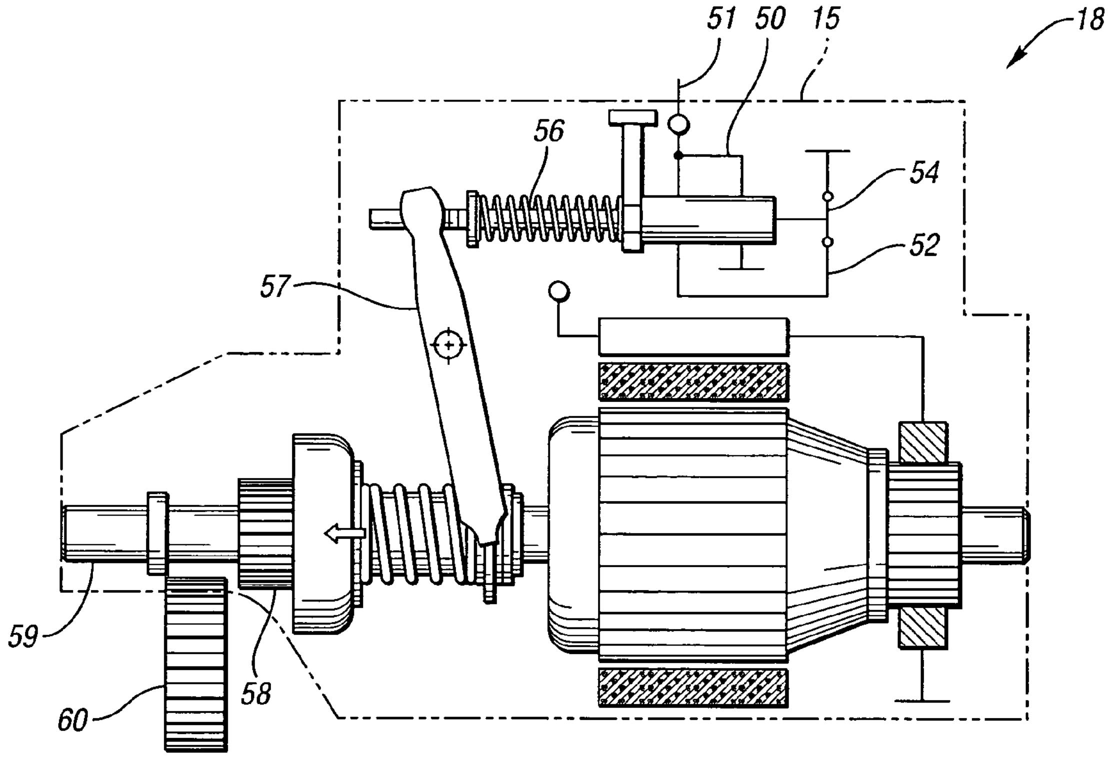
FIGS. 5*a* and 5*b* are schematic representations of a two coil pinion actuator solenoid in operation.
Figure 5B:
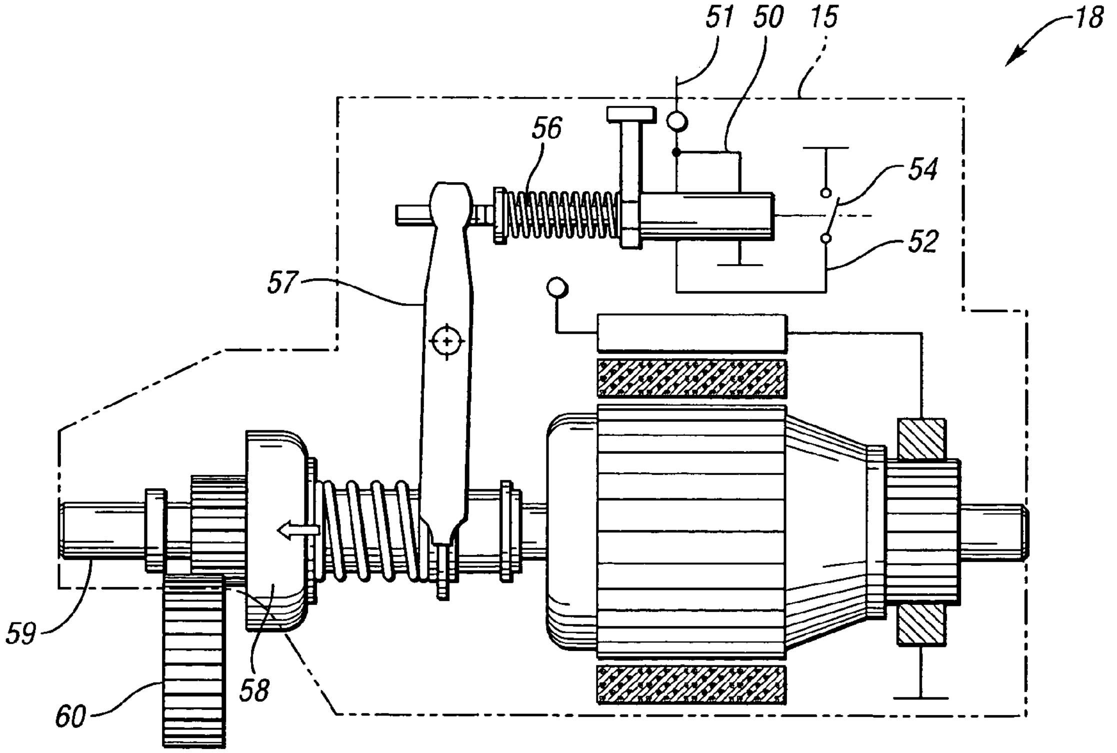

FIGS. 5*a* and 5*b* are schematic illustrations of an alternate embodiment for controlling the current to the pinion actuator solenoid 15 during the "hold" period of the pinion gear 58 pre shuttling. The pinion actuator solenoid 15 consists of two coils, first coil 50 and second coil 52. An armature 56 is operable within coils 50 and 52 when a current is applied to the terminal 51 of the pinion actuator solenoid 15. When the maximum pull-in current A for the pinion gear actuator solenoid is commanded by the cranking control module 10 the armature 56 is forced to one side by the magnetic force generated by the first coil 50 and second coil 52. This armature 56 in turn manipulates the pinion gear actuator 57 into engagement with the pinion gear 58. The pinion gear 58 slides axially on the starter motor shaft 59 to mesh with the flywheel ring gear 60 teeth. Simultaneously, as shown in FIG. 5*b*, the armature 56 engages a set of electrical contacts 54 which then open causing an interruption in current to the second coil 52. The force of the first coil 50 is sufficient to hold the pinion gear 58 in relation to the flywheel ring gear 60 during the "holding" portion of the pinion gear shuttling operation. This is an electro-mechanical method to reduce the pinion actuator solenoid 15 current during the "holding" portion of pinion gear 58 pre-shuttling.

Accordingly, the apparatus described previously provides an improved method for fast response to a restart signal for an engine 11 having a flywheel ring gear 60, a traditional starter 18 with a pinion gear 58, a pinion actuator solenoid 15, and a power relay 16, whereby the current flow to the pinion actuator solenoid 15 is controlled at a maximum pull-in current A for a predetermined amount of time 23, sufficient to allow the pinion gear 58 to shuttle to the flywheel ring gear 60. At which point, the pinion actuator solenoid 15 current is decreased to a level B to hold the pinion gear 58 in mesh with the flywheel ring gear 60. During this operation, the current flow to the power relay 16 is separately controlled at less than the minimum pull-in current C to allow the relay coil to ramp to a level that is insufficiently high enough to cause power switching of the power relay 16. This current should be sufficiently high enough to eliminate a significant portion of the time required for the power relay 16 to be switched in response to a restart signal. The method of controlling current flow to the pinion actuator solenoid 15 and separately controlling the current flow to the power relay 16 may include at least one pulse width modulation device. An alternative embodiment for the method of current control to the pinion actuator solenoid 15 is to provide two coils within the pinion actuator solenoid 15 along with a set of armature actuated electrical contacts 54 that are openable to energize the pinion actuator solenoid 15 at a relatively low current level in response to the control unit 10 to control the pinion actuator solenoid 15.

While the best modes for carrying out the invention have been described in detail, those familiar with the art to which this invention relates will recognize various alternative designs and embodiments for practicing the invention within the scope of the appended claims.

The invention claimed is:

1. An internal combustion engine operable in start-stop mode comprising:
- a starter motor having a pinion gear;
- a power relay for switching said starter motor;
- a battery for providing voltage and current to said starter;
- a pinion actuator solenoid for shuffling said pinion gear;
- a control unit programmed for operating said pinion actuator solenoid separately from said power relay; and
- a controlled current source for said power relay to provide a prime current level during engine off conditions and to increase the current to allow for switching of said power relay when a restart signal is sensed by said control unit.

2. The internal combustion engine of claim 1, wherein a controlled current source for said pinion actuator solenoid provides a maximum pull-in current for a predetermined amount of time during engine off conditions, and decreases the current for said pinion actuator solenoid to a holding current at the end of said predetermined amount of time.

3. The internal combustion engine of claim 2, wherein said controlled current source for said power relay and said controlled current source for said pinion actuator solenoid are pulse width modulation devices.

4. The internal combustion engine of claim 1, wherein said pinion actuator solenoid has two coils and an armature actuated set of electrical contacts openable to energize said pinion actuator solenoid at a relatively low current level in response to said control unit.

5. The internal combustion engine of claim 1, further comprising an engine control unit, said control unit is integral with said engine control unit.

6. The internal combustion engine of claim 1, wherein said voltage of said battery is twelve volts.

* * * * *